(12) United States Patent
Krüger et al.

(10) Patent No.: US 8,546,498 B2
(45) Date of Patent: Oct. 1, 2013

(54) METHOD FOR PRODUCING WATER-ABSORBING POLYMER PARTICLES BY POLYMERIZING DROPLETS OF A MONOMER SOLUTION

(75) Inventors: Marco Krüger, Mannheim (DE); Stefan Blei, Mannheim (DE); Wilfried Heide, Freinsheim (DE); Matthias Weismantel, Jossgrund-Oberndorf (DE); Uwe Stueven, Bad Soden (DE)

(73) Assignee: BASF SE, Ludwigshafen (DE)

( * ) Notice: Subject to any disclaimer, the term of this patent is extended or adjusted under 35 U.S.C. 154(b) by 216 days.

(21) Appl. No.: 13/002,552

(22) PCT Filed: Jul. 1, 2009

(86) PCT No.: PCT/EP2009/058246
§ 371 (c)(1),
(2), (4) Date: Jan. 4, 2011

(87) PCT Pub. No.: WO2010/003855
PCT Pub. Date: Jan. 14, 2010

(65) Prior Publication Data
US 2011/0111231 A1    May 12, 2011

(30) Foreign Application Priority Data

Jul. 7, 2008 (EP) .................... 08159844

(51) Int. Cl.
*C08F 2/01* (2006.01)
*C08F 220/06* (2006.01)

(52) U.S. Cl.
USPC .............. 526/88; 526/62; 526/317.1

(58) Field of Classification Search
USPC ............... 524/800; 526/62, 88, 317.1
See application file for complete search history.

(56) References Cited

U.S. PATENT DOCUMENTS

| | | |
|---|---|---|
| 4,020,256 A | 4/1977 | Zweigle et al. |
| 4,670,524 A | 6/1987 | Messmer et al. |
| 6,150,477 A | 11/2000 | Engelhardt et al. |
| 8,183,331 B2 * | 5/2012 | Losch et al. ............. 526/61 |
| 2002/0193546 A1 | 12/2002 | Freeman et al. |
| 2009/0192036 A1 | 7/2009 | Losch et al. |
| 2010/0010176 A1 | 1/2010 | Losch et al. |
| 2010/0029866 A1 | 2/2010 | Losch et al. |

FOREIGN PATENT DOCUMENTS

| | | |
|---|---|---|
| DE | 3519013 A1 | 11/1986 |
| EP | 0 348 180 A2 | 12/1989 |
| EP | 0 816 383 A1 | 1/1998 |
| WO | WO-96/40427 A1 | 12/1996 |
| WO | WO-2008/040714 A2 | 4/2008 |
| WO | WO-2008/040715 A2 | 4/2008 |
| WO | WO-2008/052971 A1 | 5/2008 |
| WO | WO 2008052971 A1 * | 5/2008 |

OTHER PUBLICATIONS

Buchholz et al. (eds.), Modern Superabsorbent Technology, Wiley-VCH, pp. 71-103 (1998).

* cited by examiner

*Primary Examiner* — Kelechi Egwim
(74) *Attorney, Agent, or Firm* — Marshall, Gerstein & Borun LLP

(57) ABSTRACT

A process for producing water-absorbing polymer particles by polymerizing droplets of a monomer solution in a surrounding gas phase in a reaction chamber, wherein the monomer solution is metered into the reaction chamber via at least one bore, and the diameter is from 210 to 290 μm per bore and the metering rate is from 0.9 to 5 kg/h per bore.

9 Claims, 1 Drawing Sheet

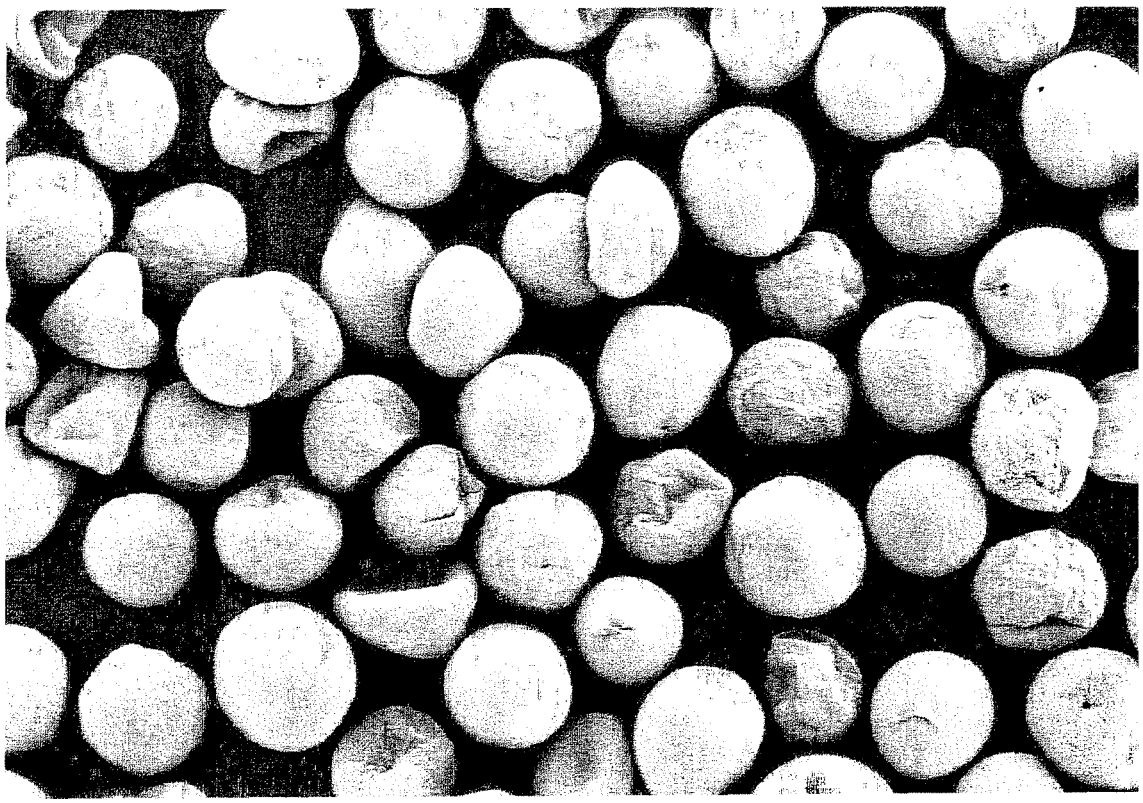

METHOD FOR PRODUCING WATER-ABSORBING POLYMER PARTICLES BY POLYMERIZING DROPLETS OF A MONOMER SOLUTION

CROSS-REFERENCE TO RELATED APPLICATIONS

This is the U.S. national phase of International Application No. PCT/EP2009/058246, filed Jul. 1, 2009, which claims the benefit of European patent Application No. 08159844.3, filed Jul. 7, 2008.

The present invention relates to a process for producing water-absorbing polymer particles by polymerizing droplets of a monomer solution in a surrounding gas phase in a reaction chamber, wherein the monomer solution is metered into the reaction chamber via at least one bore.

The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening. Water-absorbing polymers are also referred to as "superabsorbent polymers" or "superabsorbers".

Spray polymerization allows the process steps of polymerization and drying to be combined. In addition, the particle size can be set within certain limits by suitable process control.

The production of water-absorbing polymer particles by polymerizing droplets of a monomer solution is described, for example, in EP 0 348 180 A1, EP 0 816 383 A1, WO 96/40427 A1, U.S. Pat. No. 4,020,256, US 2002/0193546, DE 35 19 013 A1, WO 2008/040715 A2 and WO 2008/052971 A1.

WO 2008/040715 A2 describes a spray polymerization process with a defined residence time of the initiator in the monomer solution before the generation of droplets.

WO 2008/052971 A1 describes a spray polymerization process with specific temperature regulations.

It was an object of the present invention to provide an improved process for producing water-absorbing polymer particles by polymerizing droplets of a monomer solution in a gas phase surrounding the droplets.

More particularly, it was an object of the present invention to provide a process for producing water-absorbing polymer particles with narrow monomodal particle size distribution and high density.

The object is achieved by a process for producing water-absorbing polymer particles by polymerizing droplets of a monomer solution comprising
a) at least one ethylenically unsaturated monomer which bears acid groups and may be at least partly neutralized,
b) at least one crosslinker,
c) at least one initiator and
d) water,
in a surrounding gas phase in a reaction chamber, the monomer solution being metered into the reaction chamber via at least one bore, wherein the diameter is from 210 to 290 μm per bore and the metering rate is from 0.9 to 5 kg/h per bore.

The metering rate per bore (in kg/h) is preferably at least $$-1.9269 \cdot 10^{-7} x^3 + 2.3433 \cdot 10^{-4} x^2 - 5.4364 \cdot 10^{-2} x + 3.7719$$

where x is the diameter per bore (in μm).

The metering rate per bore (in kg/h) is preferably at most $$5.5158 \cdot 10^{-8} x^4 - 5.5844 \cdot 10^{-5} x^3 + 2.0635 \cdot 10^{-2} x^2 - 3.2606 x + 1.8698 \cdot 10^2$$

where x is likewise the diameter per bore (in μm).

The diameter of the bore and the metering rate per bore are selected such that the resulting droplets have a mean diameter preferably of from 300 to 700 μm, more preferably from 350 to 650 μm, most preferably from 400 to 600 μm. The mean droplet diameter is determined by laser diffraction, for example with the Malvern Insitec® S (Malvern Instruments Ltd.; Malvern; UK). With constant diameter of the bore, the mean droplet diameter falls with rising metering rate per bore.

The monomer solution has, at 20° C., a dynamic viscosity of preferably from 0.002 to 0.02 Pa·s, more preferably from 0.004 to 0.015 Pa·s, most preferably from 0.005 to 0.01 Pa·s. The mean droplet diameter rises with rising dynamic viscosity.

The monomer solution has, at 20° C., a density of preferably from 1 to 1.3 g/cm$^3$, more preferably from 1.05 to 1.25 g/cm$^3$, more preferably from 1.1 to 1.2 g/cm$^3$.

The monomer solution has, at 20° C., a surface tension of from 0.02 to 0.06 N/m, more preferably from 0.03 to 0.05 N/m, more preferably from 0.035 to 0.045 N/m. The mean droplet diameter increases with rising surface tension.

The temperature of the monomer solution as it passes through the bore is preferably from 10 to 60° C., more preferably from 15 to 50° C., most preferably from 20 to 40° C.

The present invention is based on the finding that the mean droplet size can be kept constant with rising diameter of the bores and greater-than-proportional increase in the metering rate per bore, and the density of the resulting water-absorbing polymer particles rises simultaneously. Water-absorbing polymer particles with higher density take up less volume and can be metered more rapidly.

Too high a metering rate leads to a bimodal particle size distribution and hence to an elevated proportion of water-absorbing polymer particles with undesirably small particle diameter.

The water-absorbing polymer particles are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The acid groups of the monomers a) are typically partly neutralized, preferably to an extent of from 25 to 85 mol %, preferentially to an extent of 50 to 80 mol %, more preferably to an extent of 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred as alkali metals, but very particular preference is given to sodium hydroxide, sodium carbonate or sodium hydrogencarbonate and mixtures thereof. Typically, the neutralization is achieved by mixing in the neutralizing agent as an aqueous solution, as a melt, or preferably also as a solid. For example, sodium hydroxide with a water content significantly below 50% by weight may be present as a waxy material with a melting point above 23° C. In this case, metered addition as piece material or a melt at elevated temperature is possible.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether. The hydroquinone monoethers may, however, also be removed from the monomer solution by absorption, for example on activated carbon.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraalloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably from 0.01 to 1.5% by weight, more preferably from 0.05 to 1% by weight, most preferably from 0.1 to 0.6% by weight, based in each case on monomer a). With rising crosslinker content, the centrifuge retention capacity (CRC) falls and the absorption under a pressure of 21.0 g/cm$^2$ (AUL0.3psi) passes through a maximum.

The initiators c) used may be all compounds which disintegrate into free radicals under the polymerization conditions, for example peroxides, hydroperoxides, hydrogen peroxide, persulfates, azo compounds and what are known as redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropiophenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxymethylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)phenyl]-2-hydroxy-2-methyl-1-propan-1-one, and mixtures thereof.

The initiators are used in customary amounts, for example in amounts of from 0.001 to 5% by weight, preferably from 0.01 to 2% by weight, based on the monomers a).

The water content of the monomer solution is preferably less than 65% by weight, preferentially less than 62% by weight, more preferably less than 60% by weight, most preferably less than 58% by weight.

The monomer solution is metered into the reaction chamber by means of at least one bore to form droplets. The bores may be present, for example, in a dropletizer plate.

A dropletizer plate is a plate having at least one bore, the liquid entering the bore from the top. The dropletizer plate or the liquid can be oscillated, which generates a chain of ideally monodisperse droplets at each bore on the underside of the dropletizer plate. In a preferred embodiment, the dropletizer plate is not agitated.

The number and size of the bores are selected according to the desired capacity and droplet size. The droplet diameter is typically 1.9 times the diameter of the bore. What is important here is that the liquid to be dropletized does not pass through the bore too rapidly and the pressure drop over the bore is not too great. Otherwise, the liquid is not dropletized, but rather the liquid jet is broken up (sprayed) owing to the high kinetic energy. The Reynolds number based on the throughput per bore and the bore diameter is preferably less than 2000, preferentially less than 1600, more preferably less than 1400 and most preferably less than 1200.

The dropletizer plate has typically at least one bore, preferably at least 10, more preferably at least 50 and typically up to 10 000 bores, preferably up to 5000, more preferably up to 1000 bores, the bores typically being distributed uniformly over the dropletizer plate, preferably in so-called triangular pitch, i.e. three bores in each case form the corners of an equilateral triangle.

The separation of the bores is preferably from 1 to 50 mm, more preferably from 2.5 to 20 mm, most preferably from 5 to 10 mm.

The polymerization reactor is flowed through by a gas. The carrier gas can be conducted through the reaction chamber in cocurrent or in countercurrent to the free-falling droplets of the monomer solution, preferably in cocurrent, i.e. from the top downward. After one pass, the carrier gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The oxygen content of the carrier gas is preferably from 0.5 to 15% by volume, more preferably from 1 to 10% by volume, most preferably from 2 to 7% by volume.

As well as oxygen, the carrier gas preferably comprises nitrogen. The nitrogen content of the carrier gas is preferably at least 80% by volume, more preferably at least 90% by volume, most preferably at least 95% by volume.

The gas velocity is preferably adjusted such that the flow in the polymerization reactor is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The gas flowing through the reactor is appropriately preheated to the reaction temperature upstream of the reactor.

The gas entrance temperature, i.e. the temperature with which the gas enters the reaction chamber, is preferably from 160 to 250° C., more preferably from 180 to 230° C., most preferably from 190 to 220° C.

Advantageously, the gas entrance temperature is controlled in such a way that the gas exit temperature, i.e. the temperature with which the gas leaves the reaction chamber, is from 100 to 180° C., more preferably from 110 to 160° C., most preferably from 120 to 140° C.

The reaction can be carried out under elevated pressure or under reduced pressure; preference is given to a reduced pressure of up to 100 mbar relative to ambient pressure.

The reaction offgas, i.e. the gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The polymer particles can be postcrosslinked for further improvement of the properties. Suitable postcrosslinkers are compounds which comprise groups which can form covalent bonds with at least two carboxylate groups of the polymer particles. Suitable compounds are, for example, polyfunctional amines, polyfunctional amidoamines, polyfunctional epoxides, as described in EP 0 083 022 A2, EP 0 543 303 A1 and EP 0 937 736 A2, di- or polyfunctional alcohols as described in DE 33 14 019 A1, DE 35 23 617 A1 and EP 0 450 922 A2, or β-hydroxyalkylamides, as described in DE 102 04 938 A1 and U.S. Pat. No. 6,239,230.

In addition, DE 40 20 780 C1 describes cyclic carbonates, DE 198 07 502 A1 describes 2-oxazolidone and its derivatives such as 2-hydroxyethyl-2-oxazolidone, DE 198 07 992 C1 describes bis- and poly-2-oxazolidinones. DE 198 54 573 A1 describes 2-oxotetrahydro-1,3-oxazine and its derivatives, DE 198 54 574 A1 describes N-acyl-2-oxazolidones, DE 102 04 937 A1 describes cyclic ureas. DE 103 34 584 A1 describes bicyclic amide acetals, EP 1 199 327 A2 describes oxetanes and cyclic ureas, and WO 2003/031482 A1 describes morpholine-2,3-dione and its derivatives, as suitable postcrosslinkers.

Preferred postcrosslinkers are ethylene carbonate, ethylene glycol diglycidyl ether, reaction products of polyamides with epichlorohydrin and mixtures of propylene glycol and 1,4-butanediol.

Very particularly preferred postcrosslinkers are 2-hydroxyethyloxazolidin-2-one, oxazolidin-2-one and 1,3-propanediol.

In addition, it is also possible to use postcrosslinkers which comprise additional polymerizable ethylenically unsaturated groups, as described in DE 37 13 601 A1.

The amount of postcrosslinker is preferably from 0.001 to 2% by weight, more preferably from 0.02 to 1% by weight, most preferably from 0.05 to 0.2% by weight, based in each case on the polymer particles.

In a preferred embodiment of the present invention, polyvalent cations are applied to the particle surface in addition to the postcrosslinkers before, during or after the postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, from 0.001 to 1.5% by weight, preferably from 0.005 to 1% by weight, more preferably from 0.02 to 0.8% by weight, based in each case on the polymer particles.

The postcrosslinking is typically performed in such a way that a solution of the postcrosslinker is sprayed onto the dried polymer particles. After the spraying, the polymer particles coated with postcrosslinker are dried thermally, and the postcrosslinking reaction can take place either before or during the drying.

The spray application of a solution of the postcrosslinker is preferably performed in mixers with moving mixing tools, such as screw mixers, disk mixers and paddle mixers. However, it is also possible to spray on the postcrosslinker solution in a fluidized bed. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron By; Doetinchem; the Netherlands), Processall Mixmill mixers (Processall Incorporated; Cincinnati; US) and Schugi Flexomix® (Hosokawa Micron BV; Doetinchem; the Netherlands).

The postcrosslinkers are typically used in the form of an aqueous solution. The content of nonaqueous solvent or total amount of solvent can be used to establish the penetration depth of the postcrosslinker into the polymer particles.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing mass ratio is preferably from 20:80 to 40:60.

The thermal drying is preferably carried out in contact dryers, more preferably paddle dryers, most preferably disk dryers. Suitable dryers are, for example, Hosokawa Bepex® horizontal paddle driers (Hosokawa Micron GmbH; Leingarten; Germany), Hosokawa Bepex® disk driers (Hosokawa Micron GmbH; Leingarten; Germany) and Nara paddle driers (NARA Machinery Europe; Frechen; Germany). Moreover, it is also possible to use fluidized bed dryers.

The drying can be effected in the mixer itself, by heating the jacket or blowing in warm air. Equally suitable is a downstream drier, for example a shelf drier, a rotary tube oven or a heatable screw. It is particularly advantageous to mix and dry in a fluidized bed drier.

Preferred drying temperatures are in the range from 100 to 250° C., preferably from 120 to 220° C., more preferably from 130 to 210° C., most preferably from 150 to 200° C. The preferred residence time at this temperature in the reaction mixer or drier is preferably at least 10 minutes, more preferably at least 20 minutes, most preferably at least 30 minutes, and typically at most 60 minutes.

To further improve the properties, the postcrosslinked polymer particles can be coated or subsequently moistened. Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20. Suitable coatings for improving the color stability (yellowing stability) are, for example, reducing agents such as sodium hypophosphite, sodium sulfite, sodium hydrogen sulfite, Brüggolite® FF6 and Brüoggolite® FF7 (Brüggemann Chemicals; Heilbronn; Germany).

The present invention further provides water-absorbing polymer particles obtainable by the process according to the invention.

The water-absorbing polymer particles obtainable by the process according to the invention have a moisture content of typically at least 10% by weight, preferably at least 12% by weight, more preferably at least 14% by weight, most preferably at least 15% by weight, and typically less than 20% by weight.

The water-absorbing polymer particles obtainable by the process according to the invention have a density of typically at least 0.55 g/cm$^3$, preferably at least 0.57 g/cm$^3$, more preferably at least 0.59 g/cm$^3$, most preferably at least 0.6 g/cm$^3$, and typically less than 0.75 g/cm$^3$.

The mean diameter of the water-absorbing polymer particles obtainable by the process according to the invention is preferably from 300 to 450 μm, more preferably from 320 to 420 μm, very particularly from 340 to 400 μm.

The water-absorbing polymer particles obtainable by the process according to the invention typically have the shape of partially indented hollow spheres (FIG. 1) and are approximately round, i.e. the polymer particles have a mean sphericity (mSPHT) of typically at least 0.84, preferably at least 0.86, more preferably at least 0.88, most preferably at least 0.9. The sphericity (SPHT) is defined as $$SPHT = \frac{4\pi A}{U^2},$$

where A is the cross-sectional area and U is the cross-sectional circumference of the polymer particles. The mean sphericity (mSPHT) is the volume-average sphericity.

The mean sphericity (mSPHT) can be determined, for example, with the Camsizer® image analysis system (Retsch Technology GmbH; Germany).

Polymer particles of relatively low mean sphericity (mSPHT) are obtained by inverse suspension polymerization when the polymer particles are agglomerated during or after the polymerization.

The water-absorbing polymer particles produced by customary solution polymerization (gel polymerization) are ground and classified after drying to obtain irregular polymer particles. The mean sphericity (mSPHT) of these polymer particles is between approx. 0.72 and approx. 0.78.

The water-absorbing polymer particles obtainable by the process according to the invention have a centrifuge retention capacity (CRC) of typically at least 15 g/g, preferably at least 20 g/g, preferentially at least 25 g/g, more preferably at least 30 g/g, most preferably at least 35 g/g. The centrifuge retention capacity (CRC) of the water-absorbing polymer particles is typically less than 100 g/g. The centrifuge retention capacity of the water-absorbing polymer particles is determined by the EDANA (European Disposables and Nonwovens Association) recommended test method No. WSP 241.2-05 "Centrifuge retention capacity".

The water-absorbing polymer particles are tested by means of the test methods described below.

Methods:

The analyses should, unless stated otherwise, be conducted at an ambient temperature of 23±2° C. and a relative air humidity of 50±10%. The water-absorbing polymer particles are mixed thoroughly before the analysis.

Mean Droplet Size

The mean droplet size of the monomer solution (D50) is the droplet size for which exactly 50% by volume of the droplets are smaller than this value, and is determined with a Malvern Insitec® S (Malvern Instruments Ltd.; Malvern; GB). A 450 mm lens and the "RTSizer" control and evaluation software are used. The measurement ready is set to from 0.1 to 2000 μm. The dropletizer plate/laser beam distance is 1.05 m, and the droplet/lens distance is 15 cm.

Distribution Width of the Droplet Size

The distribution width of the droplet size (SPAN) is $$SPAN = \frac{D90 - D10}{D50},$$

where D10 is the droplet size form which exactly 10% by volume of the droplets are smaller than this value, D50 the droplet size for which exactly 50% by volume of the droplets are smaller than this value, and D90 the droplet size for which exactly 90% by volume of the droplets are smaller than this value. A distribution width of 0 corresponds here to a monodisperse chain of droplets. The distribution width is determined with a Malvern Insitec® S (Malvern Instruments Ltd.; Malvern; GB). A 450 mm lens and the "RTSizer" control and evaluation software are used. The measurement ready is set to from 0.1 to 2000 μm. The dropletizer plate/laser beam distance is 1.05 m and the droplet/lens distance is 15 cm.

Mean Particle Size (Particle Size Distribution)

The mean particle size of the water-absorbing polymer particles is determined by the EDANA (European Disposables and Nonwovens Association) recommended test method No. WSP 220.2-05 "Particle Size Distribution".

Moisture Content

The moisture content of the water-absorbing polymer particles is determined by the EDANA (European Disposables and Nonwovens Association) recommended test method No. WSP 230.2-05 "Moisture content".

Centrifuge Retention Capacity

The centrifuge retention capacity (CRC) is determined by the EDANA (European Disposables and Nonwovens Association) recommended test method No. WSP 241.2-05 "Centrifuge Retention Capacity".

Absorption Under a Pressure of 49.2 g/cm²

The absorption under a pressure of 49.2 g/cm² (AUL0.7psi) is determined analogously to the EDANA (European Disposables and Nonwovens Association) recommended test method No. WSP 242.2-05 "Absorption under Pressure", except that a pressure of 49.2 g/cm² is established instead of a pressure of 21.0 g/cm².

Density

The density is determined by the EDANA (European Disposables and Nonwovens Association) recommended test method No. WSP 260.2-05 "Density".

The EDANA test methods are, for example, available from the European Disposables and Nonwovens Association, Avenue Eugene Plasky 157, B-1030 Brussels, Belgium.

EXAMPLES

Example 1

A monomer solution comprising 31.6% by weight of sodium acrylate, 9.9% by weight of acrylic acid, 0.17% by weight of 2,2'-azobis[2-(2-imidazolin-2-yl)propane]dihydrochloride, 0.085% by weight of sodium peroxodisulfate, 0.058% by weight of 3-tuply ethoxylated glyceryl triacrylate (approx. 85% by weight) and water was dropletized. The perforated plates used as dropletizers had 6×200 μm bores, 13×230 μm bores, 9×250 μm bores, 3×270 μm bores or 2×290 μm bores.

The droplets obtained were analyzed. The results are compiled in table 1.

TABLE 1

| Analysis of the spray profile | | | |
|---|---|---|---|
| Diameter of the bore | Metering rate per bore | D50 | SPAN |
| 200 μm | 0.41 kg/h | 595 μm | 0.57 |
| 200 μm | 0.81 kg/h | 512 μm | 0.60 |
| 200 μm | 1.62 kg/h | 450 μm | 0.62 |
| 200 μm | 3.24 kg/h | 426 μm | 0.99 |
| 230 μm | 0.54 kg/h | 754 μm | 0.74 |
| 230 μm | 1.08 kg/h | 655 μm | 0.75 |
| 230 μm | 2.16 kg/h | 579 μm | 0.74 |
| 230 μm | 4.16 kg/h | 485 μm | 1.28 |
| 250 μm | 1.22 kg/h | 593 μm | 0.62 |
| 250 μm | 1.89 kg/h | 564 μm | 0.64 |
| 250 μm | 3.24 kg/h | 532 μm | 0.61 |
| 250 μm | 5.41 kg/h | 449 μm | 1.20 |
| 270 μm | 1.35 kg/h | 608 μm | 0.66 |
| 270 μm | 2.16 kg/h | 566 μm | 0.61 |
| 270 μm | 3.78 kg/h | 516 μm | 0.60 |
| 270 μm | 6.49 kg/h | 481 μm | 1.38 |
| 290 μm | 1.62 kg/h | 615 μm | 0.63 |
| 290 μm | 2.16 kg/h | 588 μm | 0.59 |
| 290 μm | 4.87 kg/h | 578 μm | 0.69 |
| 290 μm | 6.49 kg/h | 499 μm | 1.07 |

The results show that the droplet size rises with the diameter of the bore and falls with rising metering rate. In addition, there exists a range within which the width of the droplet size distribution (span) is independent of the metering rate. Above a limiting metering rate, a further increase in the metering rate leads to a bimodal particle size distribution and a significantly increased proportion of droplets having a diameter of less than 100 μm.

Example 2

Noninventive

A monomer solution comprising 31.6% by weight of sodium acrylate, 9.9% by weight of acrylic acid, 0.17% by weight of 2,2'-azobis[2-(2-imidazolin-2-yl)propane]dihydrochloride, 0.085% by weight of sodium peroxodisulfate, 0.058% by weight of 3-tuply ethoxylated glyceryl triacrylate (approx. 85% by weight) and water was dropletized, in a heated dropletization tower (height 12 m, width 2 m, gas velocity 0.1 m/s in cocurrent). The monomer solution had, at 20° C., a dynamic viscosity of 0.0065 Pa·s, a density of 1.165 g/cm³ and a surface tension of 0.039 N/m. The dropletizer plate had 20×200 μm bores. The metering rate of the mixture was from 20.5 to 28.0 kg/h. The heating output of the gas preheating was regulated such that the gas outlet temperature in the dropletization tower was a constant 130° C.

The resulting water-absorbing polymer particles were analyzed. The results are compiled in table 3.

Example 3

The procedure was as in example 2. The dropletizer plate had 9×230 μm bores. The metering rate of the mixture was from 18.0 to 22.0 kg/h.

The resulting water-absorbing polymer particles were analyzed. The results are compiled in table 3.

Example 4

The procedure was as in example 2. The dropletizer plate had 6×250 μm bores. The metering rate of the mixture was from 18.0 to 20.5 kg/h.

The resulting water-absorbing polymer particles were analyzed. The results are compiled in table 3.

Example 5

The procedure was as in example 2. The dropletizer plate had 3×270 μm bores. The metering rate of the mixture was from 13.0 to 14.0 kg/h.

The resulting water-absorbing polymer particles were analyzed. The results are compiled in table 3.

TABLE 2

Settings

| Example | Diameter of the bores | Number of bores | Metering rate | Metering rate per bore |
|---|---|---|---|---|
| 2*) | 200 μm | 20 | 20.5 kg/h | 1.03 kg/h |
|  | 200 μm | 20 | 24.0 kg/h | 1.20 kg/h |
|  | 200 μm | 20 | 28.0 kg/h | 1.40 kg/h |
| 3 | 230 μm | 9 | 18.0 kg/h | 2.00 kg/h |
|  | 230 μm | 9 | 21.0 kg/h | 2.33 kg/h |
|  | 230 μm | 9 | 22.0 kg/h | 2.44 kg/h |
| 4 | 250 μm | 6 | 18.0 kg/h | 3.00 kg/h |
|  | 250 μm | 6 | 19.0 kg/h | 3.17 kg/h |
|  | 250 μm | 6 | 20.5 kg/h | 3.42 kg/h |
| 5 | 270 μm | 3 | 13.0 kg/h | 4.33 kg/h |
|  | 270 μm | 3 | 13.5 kg/h | 4.50 kg/h |
|  | 270 μm | 3 | 14.0 kg/h | 4.67 kg/h |

*)noninventive

TABLE 3

Results

| Example | CRC | AUL0.7 psi | Density | Moisture content | Mean particle size |
|---|---|---|---|---|---|
| 2*) | 30.2 g/g | 21.2 g/g | 0.50 g/cm$^3$ | 15.8% by wt. | 369 μm |
|  | 30.2 g/g | 21.0 g/g | 0.50 g/cm$^3$ | 14.7% by wt. | 388 μm |
|  | 32.3 g/g | 21.1 g/g | 0.51 g/cm$^3$ | 13.0% by wt. | 394 μm |
| 3 | 33.5 g/g | 22.2 g/g | 0.55 g/cm$^3$ | 15.3% by wt. | 387 μm |
|  | 32.3 g/g | 22.0 g/g | 0.55 g/cm$^3$ | 14.1% by wt. | 379 μm |
|  | 31.7 g/g | 21.8 g/g | 0.55 g/cm$^3$ | 14.0% by wt. | 384 μm |
| 4 | 31.8 g/g | 21.0 g/g | 0.58 g/cm$^3$ | 18.4% by wt. | 376 μm |
|  | 30.7 g/g | 21.7 g/g | 0.59 g/cm$^3$ | 16.1% by wt. | 382 μm |
|  | 32.4 g/g | 22.9 g/g | 0.59 g/cm$^3$ | 15.9% by wt. | 379 μm |
| 5 | 33.0 g/g | 23.1 g/g | 0.61 g/cm$^3$ | 14.7% by wt. | 366 μm |
|  | 31.3 g/g | 22.9 g/g | 0.61 g/cm$^3$ | 16.3% by wt. | 370 μm |
|  | 28.6 g/g | 20.8 g/g | 0.60 g/cm$^3$ | 18.2% by wt. | 372 μm |

*)noninventive

The results show that the density rises with rising diameter of the bores. The remaining properties of the water-absorbing polymer particles remain unchanged.

The invention claimed is:

1. A process for producing water-absorbing polymer particles by polymerizing droplets of a monomer solution comprising
    a) at least one ethylenically unsaturated monomer which bears an acid group and may be at least partly neutralized,
    b) at least one crosslinker,
    d) at least one initiator, and
    e) water,
    in a surrounding gas phase in a reaction chamber, the monomer solution being metered into a reaction chamber via at least one bore, wherein a diameter is from 210 to 290 μm per bore and a metering rate is from 0.9 to 5 kg/h per bore.

2. The process according to claim 1, wherein the metering rate per bore (in kg/h) is at least $$-1.9269 \cdot 10^{-7}x^3 + 2.3433 \cdot 10^{-4}x^2 - 5.4364 \cdot 10^{-2}x + 3.7719,$$

wherein x is the diameter per bore (in μm).

3. The process according to claim 1, wherein the metering rate per bore (in kg/h) is at most $$5.5158 \cdot 10^{-8}x^4 - 5.5844 \cdot 10^{-5}x^3 + 2.0635 \cdot 10^{-2}x^2 - 3.2606x + 1.8698 \cdot 10^2$$

wherein x is the diameter per bore (in μm).

4. The process according to claim 1, wherein the droplets have a mean diameter of from 300 to 700 μm.

5. The process according to claim 1, wherein the monomer solution at 20° C. has a dynamic viscosity of from 0.002 to 0.02 Pa·s.

6. The process according to claim 1, wherein the monomer solution at 20° C. has a density of from 1 to 1.3 g/cm$^3$.

7. The process according to claim 1, wherein the monomer solution at 20° C. has a surface tension of from 0.02 to 0.06 N/m.

8. The process according to claim 7, wherein the temperature of the monomer solution as it passes through the bore is from 10 to 60° C.

9. The process according to claim 1, wherein the water-absorbing polymer particles have a centrifuge retention capacity of at least 15 g/g.

\* \* \* \* \*